United States Patent [19]

Yamamitsu et al.

[11] Patent Number: 4,633,330

[45] Date of Patent: Dec. 30, 1986

[54] DIGITAL RECORDING AND REPRODUCING APPARATUS FOR TELEVISION SIGNAL

[75] Inventors: Chojuro Yamamitsu, Kawanishi; Ichiro Ogura, Hirakata; Kunio Suesada, Ikoma; Akira Iketani, Higashiosaka, all of Japan

[73] Assignee: Matsushita Electric Industrial Co., Ltd., Osaka, Japan

[21] Appl. No.: 620,732

[22] Filed: Jun. 13, 1984

[30] Foreign Application Priority Data

Jun. 22, 1983 [JP] Japan ................... 58-113270

[51] Int. Cl.[4] .............................................. H04N 9/80
[52] U.S. Cl. ...................... 358/310; 360/32
[58] Field of Search ............... 360/32, 33.1; 358/310, 358/330, 334, 335, 13, 12, 138, 141

[56] References Cited

U.S. PATENT DOCUMENTS

| | | | |
|---|---|---|---|
| 4,227,204 | 10/1980 | Rossi | 358/13 |
| 4,322,739 | 3/1982 | Drewery et al. | 358/13 |
| 4,468,708 | 8/1984 | Coleman, Jr. | 358/310 |

Primary Examiner—Donald McElheny, Jr.
Attorney, Agent, or Firm—Wenderoth, Lind & Ponack

[57] ABSTRACT

Disclosed is a digital recording and reproducing apparatus for television signal, which is designed to record and reproduce by sampling a television signal at a frequency lower than the Nyquist frequency, by dividing the sampled signal into blocks each of which is composed of adjacent plural sampling points, by orthogonally transforming in each block, and by subjecting the orthogonally transformed signal to weighted quantizing. The apparatus has achieved the reduction of recording bit and decrease of error propagation rate simultaneously so as to be applicable to recording and reproduction even in a home use VTR.

18 Claims, 29 Drawing Figures

FIG. 14.

| SEQUENCY | h1 | h2 | h3 | h4 | h5 | h6 | h7 | h8 |
|---|---|---|---|---|---|---|---|---|
| THE NUMBER OF BIT | 8 | 4 | 3 | 3 | 6 | 2 | 3 | 3 |

FIG. 15.
(h2)

| Y | $\tilde{Y}=Q\cdot Y$ |
|---|---|
| −128 ~ −25 | −30 |
| −24 ~ −16 | −19 |
| −15 ~ −10 | −12 |
| −9 ~ −6 | −7 |
| −5 ~ −4 | −4 |
| −3 | −3 |
| −2 | −2 |
| −1 | −1 |
| 0 | 0 |
| 1 | 1 |
| 2 | 2 |
| 3 ~ 4 | 3 |
| 5 ~ 8 | 6 |
| 9 ~ 14 | 11 |
| 15 ~ 23 | 18 |
| 24 ~ 127 | 29 |

FIG. 16.
(h3)

| Y | $\tilde{Y}=Q\cdot Y$ |
|---|---|
| −128 ~ −29 | −38 |
| −28 ~ −13 | −19 |
| −12 ~ −5 | −6 |
| −4 ~ −1 | −2 |
| 0 ~ 1 | 0 |
| 2 ~ 6 | 3 |
| 7 ~ 20 | 10 |
| 21 ~ 127 | 31 |

FIG. 17.
(h4)

| Y | $\tilde{Y}=Q\cdot Y$ |
|---|---|
| −128 ~ −39 | −50 |
| −38 ~ −29 | −27 |
| −18 ~ −7 | −10 |
| −6 ~ −2 | −3 |
| −1 ~ 1 | 0 |
| 2 ~ 7 | 3 |
| 8 ~ 20 | 11 |
| 21 ~ 127 | 30 |

FIG. 18.
(h5)

| Y | $\tilde{Y}=Q \cdot Y$ |
|---|---|
| -128 ~ -83 | -86 |
| -82 ~ -72 | -78 |
| -71 ~ -58 | -65 |
| -57 ~ -49 | -50 |
| -48 ~ -46 | -47 |
| -45 ~ -41 | -43 |
| -40 ~ -35 | -37 |
| -34 ~ -31 | -32 |
| -30 ~ -27 | -28 |
| -26 ~ -24 | -25 |
| -23 ~ -22 | -22 |
| -21 | -21 |
| -20 | -20 |
| ⁀ | ⁀ |
| -2 | -2 |
| -1 | -1 |
| 0 | 0 |
| 1 | 1 |
| ⁀ | ⁀ |
| 19 | 19 |
| 20 | 20 |
| 21 ~ 22 | 21 |
| 23 ~ 25 | 24 |
| 26 ~ 28 | 27 |
| 29 ~ 32 | 30 |
| 33 ~ 36 | 34 |
| 37 ~ 41 | 38 |
| 42 ~ 47 | 45 |
| 48 ~ 57 | 60 |
| 58 ~ 71 | 65 |
| 72 ~ 82 | 78 |
| 83 ~ 127 | 86 |

FIG. 19.
(h6)

| Y | $\tilde{Y}=Q \cdot Y$ |
|---|---|
| -128 ~ -7 | -11 |
| -6 ~ -1 | -2 |
| 0 ~ 5 | 0 |
| 6 ~ 127 | 11 |

FIG. 20.
(h7)

| Y | $\tilde{Y}=Q \cdot Y$ |
|---|---|
| -128 ~ -14 | -18 |
| -13 ~ -7 | -9 |
| -6 ~ -3 | -4 |
| -2 ~ -1 | -1 |
| 0 ~ 1 | 0 |
| 2 ~ 4 | 2 |
| 5 ~ 11 | 6 |
| 12 ~ 127 | 17 |

FIG. 21.
(h8)

| Y | $\tilde{Y}=Q \cdot Y$ |
|---|---|
| -128 ~ -46 | -60 |
| -45 ~ -23 | -30 |
| -22 ~ -10 | -14 |
| -9 ~ -3 | -5 |
| -2 ~ 2 | 0 |
| 3 ~ 8 | 4 |
| 9 ~ 21 | 12 |
| 22 ~ 127 | 31 |

DIGITAL RECORDING AND REPRODUCING APPARATUS FOR TELEVISION SIGNAL

BRIEF SUMMARY OF THE INVENTION

This invention relates to a digital recording and reproducing apparatus for television signal, and more particularly to a digital recording and reproducing apparatus for television signal which carry out both reduction of recording bit rate and the improvement of error propagation characteristic to obtain a sufficiently high video quality even if a low cost and low bit rate home-use video tape recorder (VTR) is used.

BACKGROUND OF THE INVENTION

Recently, various digital recording and reproducing apparatus for television signal which record a television signal on a recording medium and reproduce from it by sampling and converting it to digital signals have come to be proposed.

One kind of such digital recording and reproducing apparatus is business use one which mainly uses the characteristic of no-deterioration of the picture quality in case of dubbing. In this kind of business use apparatus, for instance, an NTSC color television signal is sampled at a frequency three times that of a color subcarrier $f_{sc}$, and this sampled signal is directly subjected to PCM (pulse code modulation), without band compressing process, to be recorded and reproduced. When this NTSC color television signal is sampled at a frequency of $3 \cdot f_{sc}$ and coded into 8 bits per sampling point, the recording bit rate becomes as high as 86 Mbits/sec.

Another kind of such digital recording and reproducing apparatus is one which is designed to record and reproduce a television signal digitally by using a home use VTR of low cost and low bit rate while somewhat sacrificing the picture quality. In a low bit rate digital recording and reproducing apparatus, it is necessary to use the band compression techniques to thereby reduce the recording bit rate.

Regarding the band compression, supposing that upper limit frequency of band of a signal to be band-compressed is $f_c$, an original signal, generally, cannot be reproduced unless it is sampled by a frequency higher than $2 \cdot f_c$ (which is called a Nyquist frequency). However, with respect to a signal whose frequency spectrum has a special configuration, such as television signals, it is known as the sub-Nyquist sampling method that an origianl signal can be reproduced almost completely by interpolation, even if the signal is sampled at a frequency lower than the Nyquist frequency of $2 \cdot f_c$ by effectively making use of the special configuration of the spectrum. For instance, an NTSC color television signal can be sampled at a sub-Nyquist frequency of $2 \cdot f_c$ ($f_{sc}$ is the frequency of color subcarrier). In this case, considering of coding into 8 bits per sampling point, the recording bit rate is 57.6 Mbits/sec, so that the recording bit rate of 86 Mbits/sec in the above case of sampling by three times may be decreased. But this rate of 57.6 Mbits/sec is still too high to record in a low bit rate machine such as a home use VTR.

In the past, it was attempted to reduce the recording bit rate to 28.6 Mbits/sec by use of the combination of 2H type sub-Nyquist sampling method and DPCM (differential PCM) coding. This attempt was disclosed in the article entitled "Experiment of low bit rate digital VTR", pages 576 ~ 580 published in the Journal of the Institute of Television Engineering, Vol. 35, No. 7 (1981).

Incidentally, an encoder for DPCM coding and a decoder for demodulating DPCM coded signals are generally described below. First at the encoder side, a signal predicted by a predictor, and an input signal, of for instance, 8-bit, are compared and their error signal, i.e., a signed representative of difference between the above two signals is determined at a subtractor. The number of bits of the output signal of this subtractor is reduced, say, to 4 bits by a quantizer. At the same time, in a local decoder comprising an adder and an inverse quantizer having the inverse characteristics of the quantizer, a local decoded signal is obtained. The local decoded signal is applied to the predictor to obtain a prediction signal with respect to the present input signal. This prediction signal is applied to one input of the subtractor in order to obtain the error signal. On the other hand, at the decoder side, the above 4-bit signal from the encoder is first applied to another inverse quantizer having the same characteristics as the inverse quantizer in the encoder and is returned to the original 8-bit signal. In consequence, this 8-bit signal is fed to another adder, which finds the sum of this 8-bit signal and an output of another predictor having the same prediction characteristics as the predictor in the encoder so as to restore the input signal. Thus, in the process of decoding the DPCM coded signals, since the transmitted prediction errors are sequentially added on the basis of the previous value, if a bit error occurs in the midst of transmission, this error is propagated successively. That is, in the above case of recording and reproducing television signals by combining the sub-Nyquist sampling method and DPCM coding, although the recording bit rate may be reduced to a recordable region, there seems to be left a room for further improvement of the error propagation characteristics.

Meanwhile, in this DPCM coding, in order to minimize the difference between input signal and prediction signal, that is, so-called prediction error, and to reduce the number of quantizing bits of a quantizer, it is preferable to compose the prediction signal of the predictor from the signals at the sampling points arrayed in two dimensions on the television screen, or more preferably, in three dimensions including the direction of the time. However, in such two- or three-dimensional predictor, the error propagation also expands two-dimensionally or three-dimensionally. When the signal containing such error is reproduced, it results in an extreme deterioration of picture quality. At the present, however, there has been found no effective means of preventing the error propagation completely. It is possible to reduce the error propagation by correcting and concealing the error, but a larger circuit and a higher cost are required for this purpose. In particular, this problem of error propagation is fatal in a digital recording and reproducing apparatus with relatively high bit error rate of $10^{-4} \sim 10^{-5}$ of reproduction signal such as a digital VTR for high density recording.

Accordingly, it is a principal object of the present invention to obtain a sufficinet reproduction picture quality in a recording and reproducing apparatus with a relatively high bit error rate such as a home use VTR by reducing the recording bit rate to a level recordable even by a home-use VTR and simultaneously minimizing the bit error propagation range while maintaining the picture quality of the input television signals.

This and other objects are accomplished by a digital recording and reproducing apparatus for television signal comprising sampling means for sampling a television signal with upper limit frequency $f_c$ at a frequency lower than $2 \cdot f_c$ and to deliver a signal quantized into N bits, orthogonal transformation means for transforming orthogonally to a block composed of L sampling points out of the above quantized sampling points, quantizing means for quantizing the orthogonally transformed signals into average M bits ($M \leq N$) per sampling point, recording means for recording the television signals obtained by quantizing onto a recording medium, reproduction means for reproducing the recorded television signals out of the same recording medium, inverse quantizing means having the inverse quantizing characteristics of the above quantizing means for quantizing inversely the television signals reproduced by the reproduction means, orthogonal inverse transformation means having the inverse transformation characteristics of the above orthogonal transformation means for inversely transforming orthogonally the above inversely quantized signals, and interpolation reproduction means for synthesizing an interpolation signal from a sampling point adjacent to this inversely orthogonally transformed television signal and for interpolating the above reproduction signal by the interpolation signal.

In the embodiments of this invention, the television signal is component color television singal or composite color television signal. The sampling frequency is an integer multiple of horizontal scanning frequency $f_H$ of a television signal. The orthogonal transformation is an Hadamard transformation. The block of orthogonal transformation is composed of L sampling points adjoining to each other arrayed in a rectangular grid form or a rectangular body grid form two-dimensionally or three-dimensionally. The block of orthogonal transformation may be composed of L sampling points adjoining to each other arrayed two-dimensionally within a present field. Furthermore, the block of orthogonal transformation may be composed of L sampling points adjoining to each other arrayed three-dimensionally across plural fields or frames. As the block of this orthogonal transformation, a first block composed of L sampling points adjoining to each other arrayed two-dimensionally within a field, and a second block composed of L sampling points adjoining to each other arrayed three-dimensionally cross plural fields or frames are selectively used depending on suitability. The aforesaid composite color television signal is an NTSC color television signal, and its sampling frequency is twice the color subcarrier freqeuncy $f_{sc}$.

In other embodiments, it is constituted that the television signal with upper limit frequency $f_c$ be sampled with a frequency which is lower than $2 \cdot f_c$ and an integer multiple of horizontal scanning frequency $f_H$ of television signal and shifting the phase by 180° in every field. It is also constituted to synthesize an interpolation signal from adjacent sampling points of at least one field before as for the reversely orthogonally transformed television signal. The block of orthogonal transformation is composed of L sampling points adjoining to each other arrayed in a rectangular grid form within a field. The interpolation reproduction means is constituted so that the higher frequency portion of the recorded television signals may be interpolated from the adjacent sampling points of one field before while the lower frequency portion may be done from the adjacent sampling points in the present field.

Another embodiment comprises movement detecting means for detecting the time-related movement of reproduction signals, first interpolation signal synthesizing means for synthesizing an interpolation signal from adjacent sampling points within a present field, second interpolation signal synthesizing means for synthesizing an interpolation signal from adjacent sampling points of at least one field before, interpolation signal selecting means for selecting one of the outputs from first and second interpolation synthesizing means according to the information from the movement detecting means, and interpolation processing means for interpolating the reproduction signals by the interpolation signal selected by the interpolation signal selecting means.

Still more, this invention is applied to a digital recording apparatus for television signal comprising sub-Nyquist sampling means for sampling a television signal with upper limit frequency $f_c$ at a frequency lower than $2 \cdot f_c$, orthogonal transformation means for assembling the sampled sampling points into a block and orthogonally transforming to the block, quantizing means for quantizing the orthogonally transformed signal, and recording means for recording the television signal obtained by this quantizing onto a recording medium. In this case, the sampling frequency is $2 \cdot f_{sc}$ ($f_{sc}$ is a color subcarrier frequency).

More specifically, this invention relates to a digital recording and reproducing apparatus for television signal intended to sample the television signal with upper limit frequency $f_c$ at a frequency lower than $2 \cdot f_c$, assemble the sampled sampling points into a block, orthogonally transform to the block, quantize the orthogonally transfomred signals, and reproduce the signals recorded onto a recording medium, comprising reproduction means for reproducing the recorded television signals, inverse quantizing means having the inverse quantizing characteristics of the quantizing in recording mode for inversely quantizing the television signals reproduced by the reproduction means, orthogonal inverse transformation means having the inverse transformation characteristics of the orthogonal transformation in recording mode for inversely transforming orthogonally the inversely quantized signals, and interpolation reproduction means for synthesizing an interpolation signal from adjacent sampling points with respect to the inversely orthogonally transformed television signals for interpolating the reproduction signals by the interpolation signal.

As explained above, according to the digital recording and reproducing apparatus for television signal of the present invention, the following effects will be obtained.

(1) An input television signal can be recorded at a low bit rate (for instance 28.6 Mbits/sec), and at the same time, as compared with the case using DPCM coding, the error propagation characteristic is extremely improved. Therefore, the load to error correction and error concealment is smaller, and the circuit may be reduced in size and the cost is also lowered. Even when a home-use VTR is used, a television signal can be recorded and reproduced digitally.

(2) In case an incorrectable error occurs, it does not cause a serious problem visually, and a sufficient reproduction picture quality for home viewing may be obtained, since its propagation range is limited to a narrow area.

While the novel features of the invention are set forth with particularly in the appended claims, the invention,

BRIEF DESCRIPTION OF THE DRAWINGS

FIG. 14 shows an example of bit distribution of each sequency assuming that the average number of bits per sampling point of quantizing is 4 bits;

FIGS. 15 through 21 are examples of quantizing characteristics of the quantizer in relation to the bit distribution in FIG. 14;

DETAILED DESCRIPTION OF THE INVENTION

Figure 1:
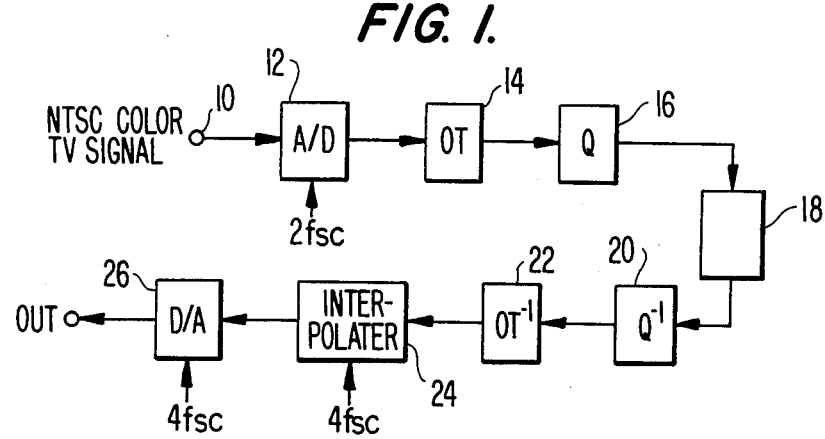
FIG. 1 is a schematic block diagram illustrating a digital recording and reproducing apparatus for television signal according to this invention.

FIG. 1 is a schematic block diagram showing a digital recording and reproducing apparatus for television signal, as one of the embodiments of the present invention, which is designed for high efficiency coding by combining the sub-Nyquist sampling and orthogonal transformation coding. An NTSC color TV signal fed through an input terminal 10 is applied to an A/D converter 12, in which it is sampled at a frequency $f_s$ which is lower than two times of its upper limit frequency $f_c$ (e.g., $f_s$ is $2 \cdot f_{sc}$) and is quantized into N bits (e.g., 8 bits) per sampling point. This signal is orthogonally transformed to a block composed of adjacent L (e.g., eight) sampling points in a orthogonal transformer 14, and is compressed by a quantizer 16 into an average of M bits (e.g., 4 or 5 bits) per sampling point. Compressed signal is then sent into a recording and reproducing system 18 at a bit rate of $M \times f_s$ bits/sec (29 to 36 Mbits/sec) to thereby be recorded onto a recording medium such as magnetic tape and optical disc. A signal reproduced from the recording and reproducing system 18 is restored to the original N-bit singal by way of an inverse quantizer 20 and an inverse orthogonal transformer 22 having the characteristics inverse to those of said quantizer 16 and orthogonal transformer 14. In an interpolator 24, the signal is interpolated and is sent into a D/A converter 26 at a rate of $2 \cdot f_s$ (e.g. $4 \cdot f_{sc}$) to be restored to an analog signal. As a result, the signal having picture quality nearly equal to that in direct sampling at $2 \cdot f_s$ (e.g., $4 \cdot f_{sc}$) is produced from an output terminal 28.

Figure 2:
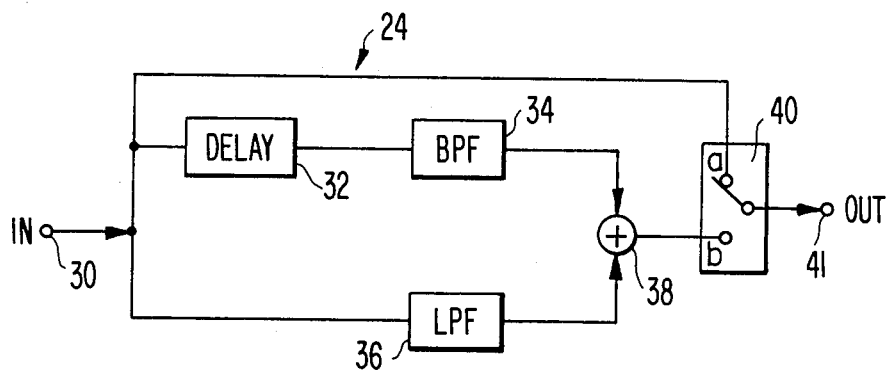
FIG. 2 is a detailed block diagram of the interpolator shown in FIG. 1.

Here, depending on the phase of the above sampling frequency $2 \cdot f_{sc}$ and the structure of the interpolator 24, there exist three types of sub-Nyquist sampling method, those are 1H type, 2H type and field type, as described below. FIG. 2 shows a general example of the strucutre of the interpolator 24, in which numeral 30 is an input terminal of the interpolator 24, 32 is a delay circuit, 34 is a band pass filter, 36 is a low pass filter, 38 is an adder, 40 is an interpolating switching circuit, and 41 is an output terminal of the interpolator.

That is, in this interpolator, when the movable contact of the switching circuit 40 is connected to one fixed contact a, the input signal applied to input terminal 30 is directly outputted, whereas when it is connected to the other fixed contact b, the signal passing through the band pass filter 34 after delayed in the delay circuit 32 and another signal passing through the low pass filter 36 are combined by the adder 38, to thereby be outputted.

Figure 3:
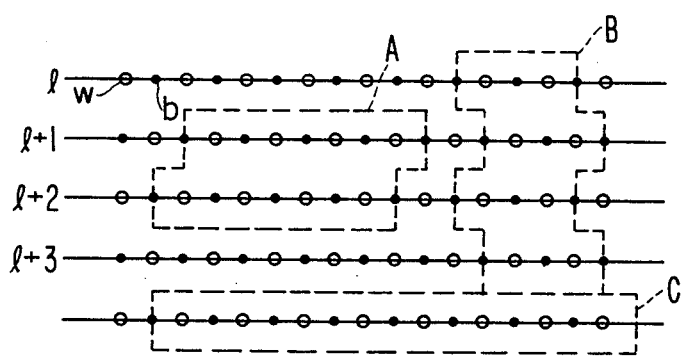
FIGS. 3, 4, 5 show the array of sampling points and block configuration of Hadamard transformation obtained by sub-sampling of 1H 2H, and field type sub-Nyquist sampling respectively.
Figure 4:
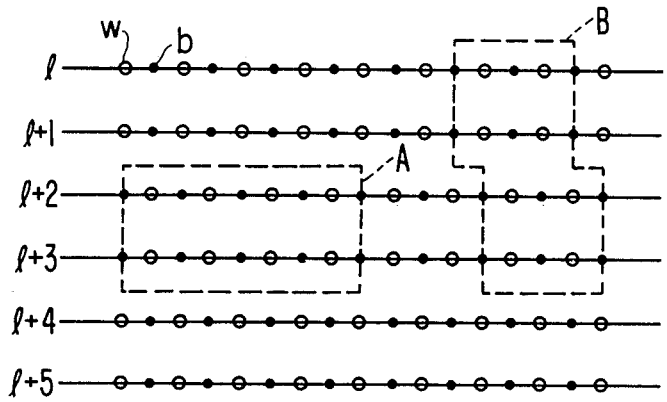
Figure 5:
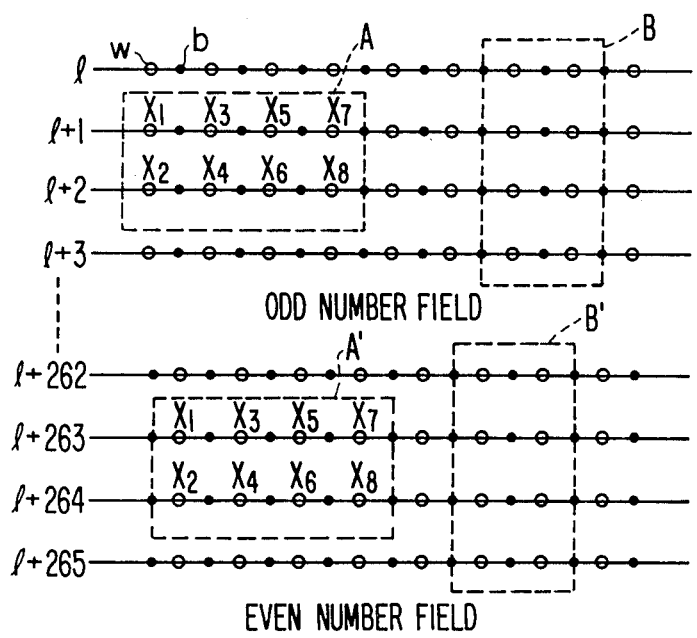
Figure 6:
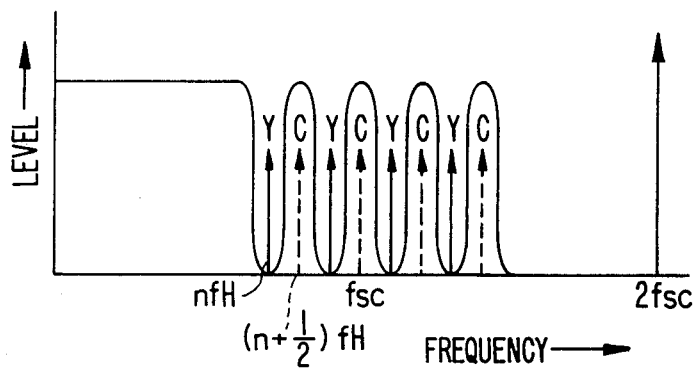
FIGS. 6, 7, 8 show the frequency transmission characteristics of the interpolators in 1H, 2H and field type sub-Nyquist sampling.
Figure 7:
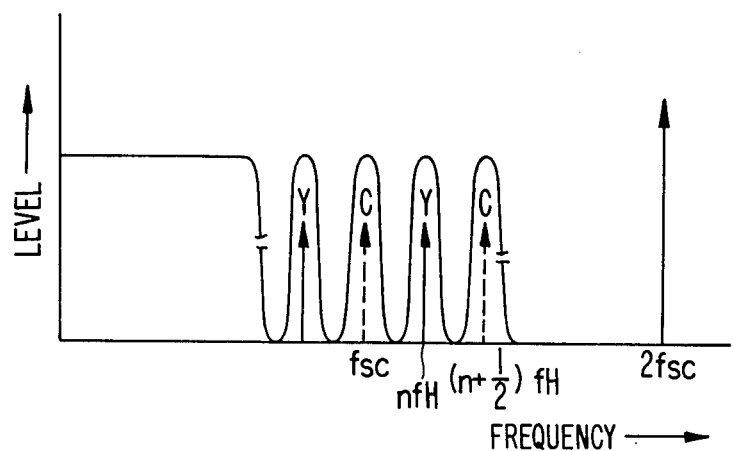
Figure 8:
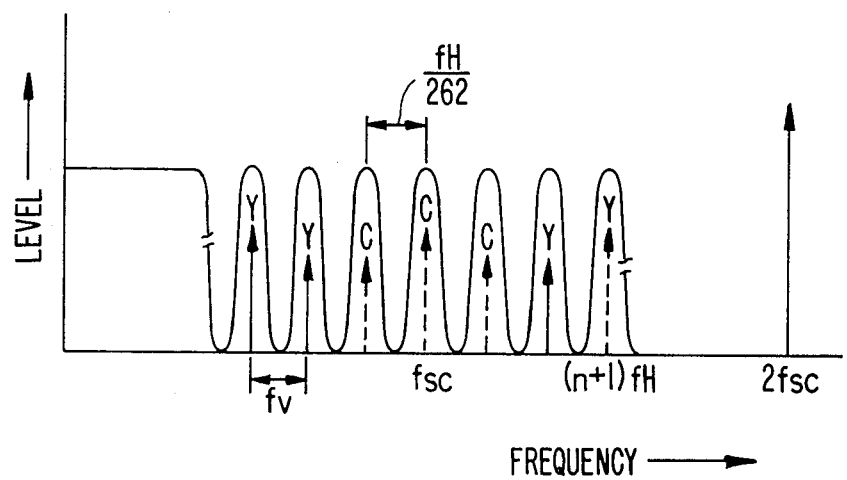

In the sub-Nyquist sampling method of 1H, type, 2H type and field type, the phase of the sampling frequency $2 \cdot F_{sc}$ is shifted by 180° at every 1H, every 2H and every field to sample the signal (H is the horizontal scanning period). The respective disposition of the sampling points by these sampling methods are shown in FIGS. 3, 4 and 5. The field means the television screen corresponding to the portion of interlaced 262.5H transmitted at 60 Hz, and the frame means the television screen corresponding to the portion of 525H transmitted at 30 Hz. In FIGS. 3, 4 and 5, circle "w" shows the sampling points to be transmitted by sampling, and dot "b" shows the sampling points to be interpolated in reproduction mode. In order that the sampling points may be arranged in a grid form as shown in these figures, it is necessary that the sampling frequency is an integer multiple of the horizontal scanning frequency $f_H$ of television signal. Such grid shaped disposition or pattern is preferable from the standpoint of signal processing because various controls are easy. These sampling points are interpolated when the signals of adjacent sampling points are outputted by connecting the movable contact of the switching circuit 40 to the fixed contact b in the interpolator as shown in FIG. 2 at the time of reproduction. In the case of NTSC color TV signal, the delay duration of the delay circuit 32 in FIG. 2 is 1H, 2H, and 262H in the sub-Nyquist sampling method of 1H, type, 2H type, and field type, respectively (H is the horizontal scanning period). The frequency transmission characteristics of 1H, 2H and field type interpolators and shown in FIGS. 6, 7, and 8, respectively, in which the comb filter characteristics having the period corresponding to the delay duration of the interpolator are noted in the high frequency band. In FIGS. 6, 7 and 8, $f_H$ and $f_V$ are respectively horizontal scanning frequency and vertical scanning frequency of television signals. Further, Y and C denote a brightness signal and a color signal of a color TV signal, respectively.

The following are disclosed from these diagrams.

That is, in the 1H type sub-Nyquist sampling method (see FIGS. 3 and 6), since the high frequency components of the brightness signal (Y) are removed by the comb filter characteristics shown in FIG. 6, the horizontal resolution is considerably deteriorated on the TV screen.

In the 2H type sub-Nyquist sampling method (see FIGS. 4 and 7), since the band in the verical direction is limited nearly to ¼, the vertical resolution is deteriorated on the TV screen.

Although the 1H type and 2H type sub-Nyquist sampling methods have such disadvantages as above, they are advantageous in a simplified apparatus since they can be constructed very compactly and at low cost, as compared with the filed type sub-Nyquist sampling method which is explained later, because the required delay duration of the delay circuit of the interpolator is 1H and 2H, respectively. Furhter, in the above explanations, composite color signal such as NTSC singal is applied as input TV signal, but when B&W (black & white) TV signal or component color TV signal is applied, the disadvantages of deterioration of horizontal resolution is eliminated in the 1H type sub-Nyquist sampling method, and an extreme advantage is expected.

On the other hand, in the filed type sub-Nyquist sampling method, its frequency transmission characteristics in the high frequency region are comb filter characteristics of nearly field period (262H) as shown in FIG. 8, and when the input TV signal is a still picture or a picture of less movement, the resolution is far superior to that of the 1H type or 2H type sub-Nyquist sampling method. However, in the field type sub-Nyquist sampling method, a field memory for storing signals for one field is required in the interpolator (with a storage capacity of about 1 Mbit, assuming the sampling at $2 \cdot f_{sc}$ and quantizing of 8 bits), and the resolution is deteriorated if the input TV signal is a fast moving picture.

Incidentally, the present semiconductor integration technology is advancing at an unimaginable pace, and the problem of the necessity of field memory will be soon solved, and the problem of deterioration of resolution in the case of a fast moving picture may be considerably improved by an adequate combination with 1H type or 2H type or other method.

When Hadamard transformation is used as the orthogonal transformation explained in FIG. 1, the aforesaid error propagation can fall only within the block of Hadamard transformation [the block composed of adjacent L sampling points (L 32 $2^k$, k being an integer of not less than 1, for instance, eight sampling points if the transformation unit in Hadamard transformation is 8 samples) as shown in FIGS. 3, 4, 5], and the error is not so perceptible visually when the number of degrees of Hadamard transformation is not so great. The circuit load for correcting or adjusting the error is smaller. In addition, from the standpoint of compression effect, the performance nearly similar to that of the DPCM may be obtained. The groups of sampling points enclosed by broken lines A(A'), B(B') shown in FIGS. 3 through 5 are structural examples of Hadamard transformation blocks corresponding to the 1H type, 2H type and field type sub-Nyquist smapling respectively, assuming two-dimensional 8-th degree Hadamard transformations. Besides, as indicated by C in FIG. 3, a one-dimensional block may be considered, but it is not proper because the distance between sampling points in the block is too remote. A three-dimensional block considering the time direction may be considered, which is highly expected in the future despite the similar problem as explained in relation to the field type sub-Nyquist sampling. For the sake of simplicity of explanation, the following descriptions refer only to two-dimensional blocks.

Generally, in order to raise the efficiency of compression by Hadamard transformation, the correlation between sampling points within a block should be preferably high. By nature, the sampling points of TV signals are higher in correlation, generally, when the distance is nearer. In other words, it is desirable to compose the block of Hadamard transformation with sampling points arrayed in a rectangular grid form on the TV screen.

That is, referring now to block A in FIGS. 3 through 5, the 2H type and field type are superior to the 1H type, while in block B the filed type is superior to the 1H type or 2H type. That is, in the 1H type it is impossible to compose the block in a rectangular grid form, and in the 2H type it is also impossible except in a special case (that is, when the length in the vertical direction is 2H).

On the other hand, in the field type, the block can be composed in a rectangular grid form in any case. Taking into consideration the original performance of the field type sub-Nyquist sampling stated above, a further compression effect is expected when the Hadamard transformation is combined with the filed type sub-Nyquist sampling.

The present invention is more specifically described below by referring to an example of a digital magnetic recording and reproducing apparatus for television signal which uses the combination of the Hadamard transformation and field type sub-Nyquist sampling.

Figure 9:
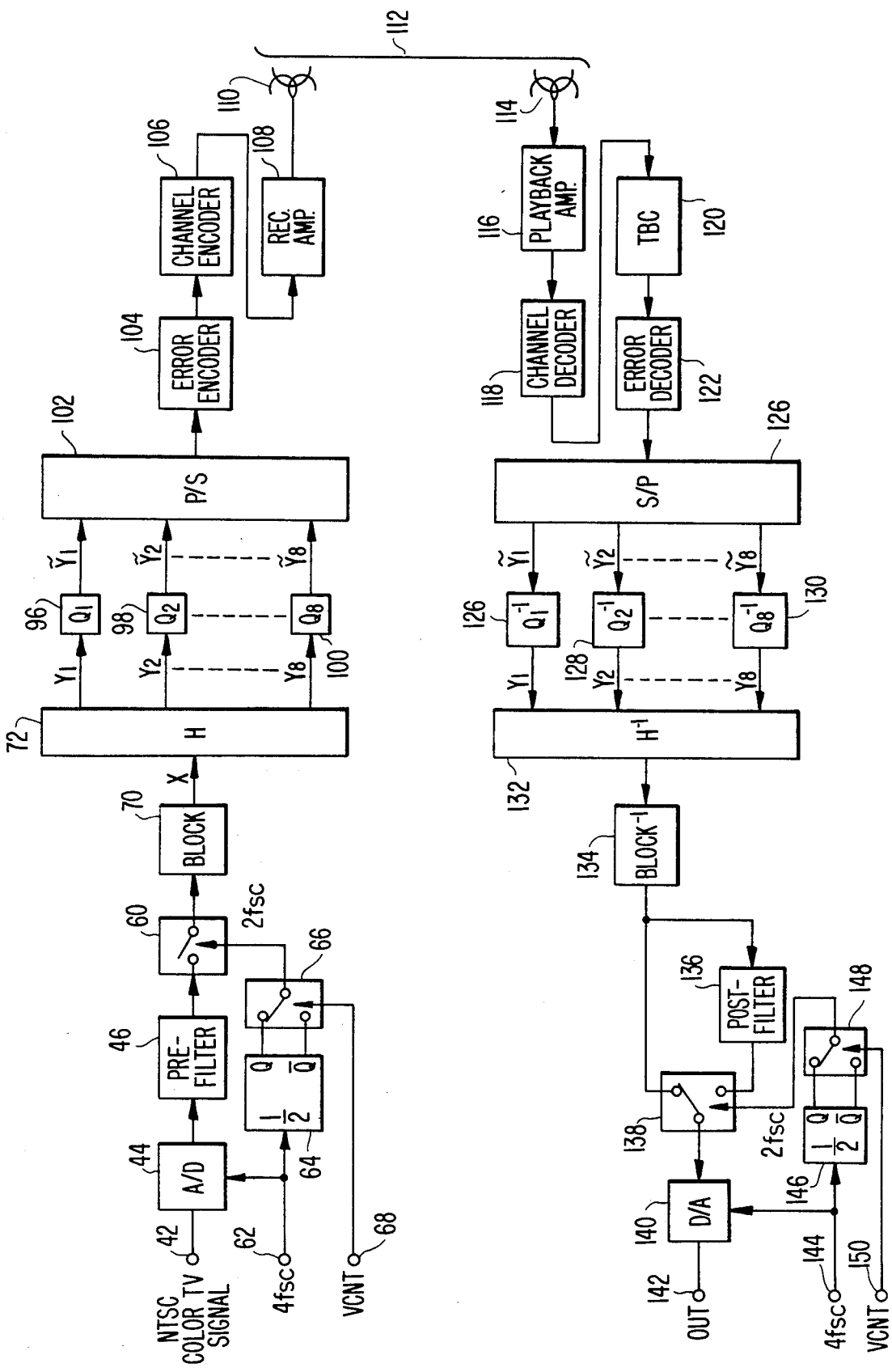
FIG. 9 is a block diagram of a digital recording and reproducing apparatus for television signal in one of the embodiments of the present invention.

FIG. 9 shows an example of systematic structure of this digital magnetic recording and reproducing apparatus. In this apparatus, the input NTSC color TV signal is A/D converted at a frequency of $4 \cdot f_{sc}$, and sampling points are thinned out to a half by the pre-filter and sub-sampler, while the number of bits per sampling point is also reduced by a half by the Hadamard transformation and quantizing. In consequence, the signal is recorded into a tape through a recording head by way of an error encoder, channel encoder and recording amplifier. In reproduction mode, a reproduction signal is picked up from the tape through a playback head, and is sent through the playback amplifier, channel decoder, TBC (time base corrector), and error decoder, and it is restored to a signal having the original number of bits per each sampling point by reverse quantizing and reverse Hadamard transformation. Meanswhile, an interpolating signal is prepared by a post-filter, and the sampling points thinned out by the sub-sampler are interpolated, and the signal is finally D/A converted at a frequency of 4·$f_{sc}$ so that the original NTSC color TV signal may be restored.

Figure 10:
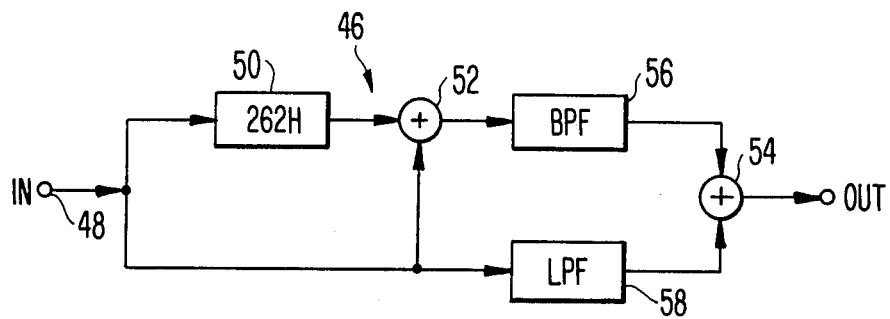
FIG. 10 is a block diagram practically showing the structure of the prefilter shown in FIG. 9.

Further, referring to FIG. 9, the NTSC color TV signal fed into an input terminal 42 is first sampled at a frequency of 4·$f_{sc}$ ($f_{sc}$ is a color subcarrier frequency) in an A/D converter 44, and is quantized into 8 bits. Then, in a pre-filter 46, signal components to cause alias components are preliminarily removed by the sub-sampling in the sub-sampler 60. A structural example of this pre-filter 46 is shown in FIG. 10. In this figure, numeral 48 denotes an input terminal of the pre-filter 46, 50 is a delay memory for the portion of 262H, 52 and 54 are full adders, 56 is a band pass filter (BPF), and 58 is a low pass filter(LPF). Concrete structures of the BPF and LPF are described below, The signals passing through the pre-filter 46 are thinned out at every sample by the sub-sampler 60, and are reduced to the half rate, i.e., 2·$f_{sc}$. This 2·$f_{sc}$ sub-sampling clock is obtained by dividing the clock of 4·$f_{sc}$ applied to terminal 62 to half by the ½ dividing circuit 64, and its phase is controlled by the V CNT signal applied to terminal 68 to thereby be shifted by 180° in every field by a switching circuit 66. The array of sampling points after sub-sampling becomes as shown in FIG. 5. This V CNT signal is explained later. Then, in a block forming circuit 70, a signal is divided into blocks, each composed of eight adjacent sampling points, e.g., A, A' as shown in FIG. 5, and then, sent to the next Hadamard transformer 72. The block forming circuit 70 may be easily realized by controlling the writing and reading address as of RAM having a capacity of 2H, for instance.

Supposing that the input column vector comprising sample value columns in a block is X and the output column vector after Hadamard transformation is Y, $$X = \begin{pmatrix} X_1 \\ X_2 \\ X_3 \\ X_4 \\ X_5 \\ X_6 \\ X_7 \\ X_8 \end{pmatrix} \quad Y = \begin{pmatrix} Y_1 \\ Y_2 \\ Y_3 \\ Y_4 \\ Y_5 \\ Y_6 \\ Y_7 \\ Y_8 \end{pmatrix} \quad (1)$$

the Hadamard transformation is expressed by the following formula:

$$Y = H_8 \cdot X \ldots \quad (2)$$

where, $H_8$ is an 8-th degree Hadamard transformation matrix, which is expressed as follows.

$$H_8 = \frac{1}{\sqrt{8}} \begin{pmatrix} + + + + + + + + \\ + - + - + - + - \\ + + - - + + - - \\ + - - + + - - + \\ + + + + - - - - \\ + - + - - + - + \\ + + - - - - + + \\ + - - + - + + - \end{pmatrix}$$

where, "+" is +1 and "−" means −1.

Figure 11:
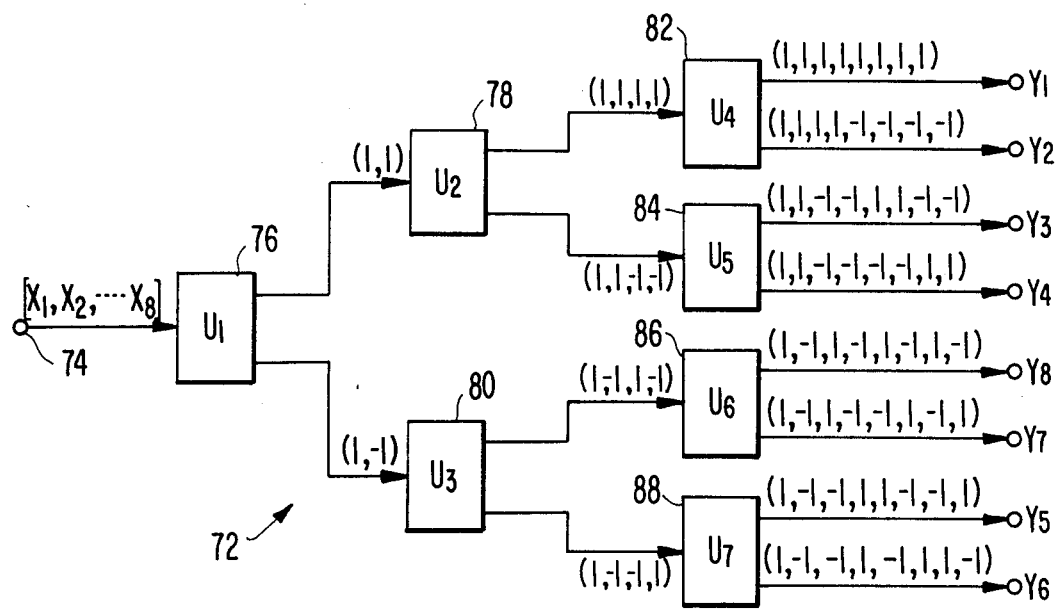
FIG. 11 is a block diagram showing an example of the structure of the Hadamard transformer shown in FIG. 9.
Figure 12:
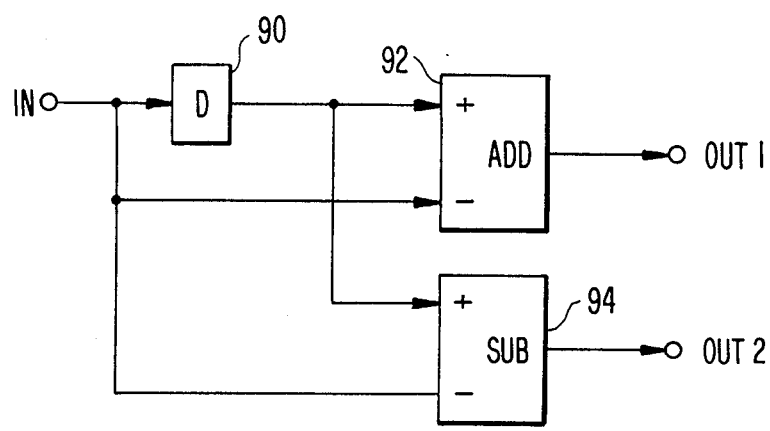
FIG. 12 is a block diagram of the arithmetic unit shown in FIG. 11.

A structural example of Hadamard transformer 72 which executes this Hadamard transformation is shown in FIG. 11, in which numeral 74 denotes an input terminal of Hadamard transformer 72, and 76, 78, 80, 82, 84, 86, 88 are arithmetic units having identical arithmetic functions. Each arithmetic unit is, as shown in FIG. 12, composed of one clock delay unit 90, adder 92, and subtractor 94.

Figure 13:
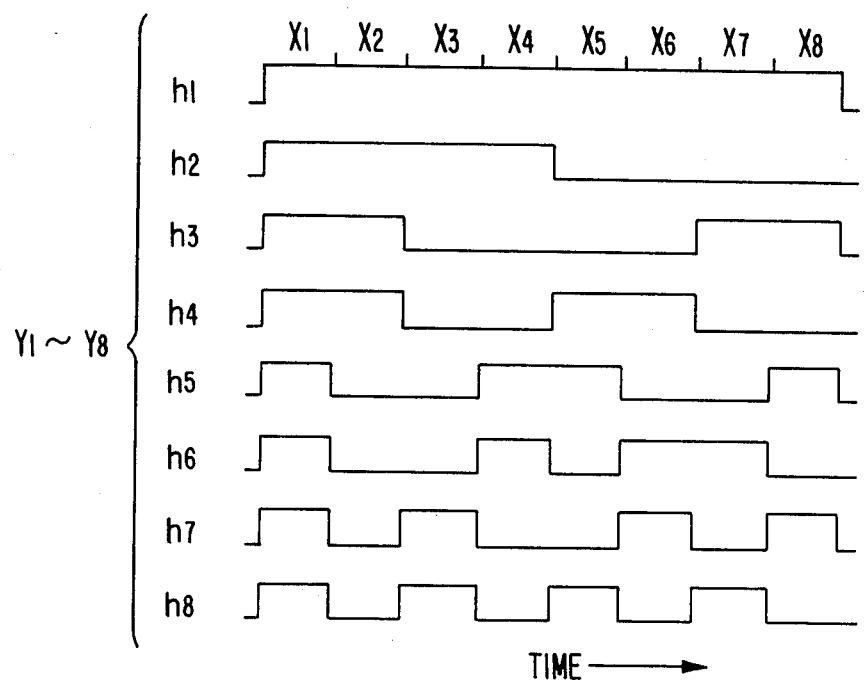
FIG. 13 describes the correspondence between the eight sequencies obtained by the 8th-degree Hadamard transformation and the input signal value row [X]

Outputs $Y_1$, $Y_2$ ... $Y_8$ obtained by the Hadamard transformation, are components corresponding to eight sequencies $h_1$, $h_2$ ... $h_8$, shown in FIG. 13 (however, the subscript numerals of symbols do not always correspond to each other).

That is, $Y_1$ corresponds to the component of sequency $h_1$ and is equivalent to the mean value of eight input sample values ($X_1$ to $X_8$), and it is usually the component of the greatest energy, and is important also visually. For each component, the number of bits is distributed in consideration of the energy distribution and visual effect, and an optimum quantizing is carried out in eight quantizers 96, 98 ... 100.

Figure 22:
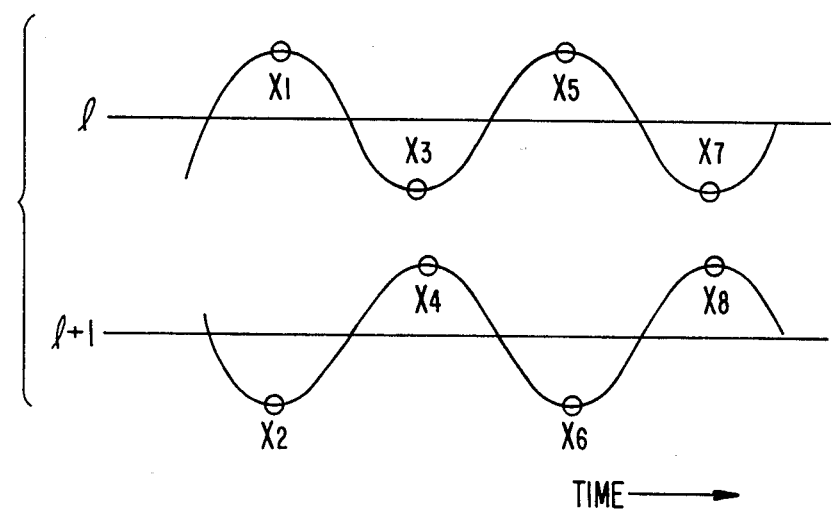
FIG. 22 shows the relation between phase of sub-carrier signal and sampling point.

When the mean number of bits after quantizing is 4 bits, the bit distribution and the quantizing characteristics of components $h_2$ to $h_8$ become as shown in FIG. 14, FIGS. 15 through 21 as one of examples. As for $h_1$, since the bit distribution is 8 bits, it may be directly transmitted without quantizing. Quantizers 96, 98 ... 100 may be easily realized by using ROMs. Here, the component of sequency $h_5$ has 6 bits, greater than the distribution bits of other sequency components except $h_1$, which is because, as evident from the relation between subcarrier phase and sampling point in FIG. 22, $h_5$ is a sequency corresponding to a color signal component. That is, FIG. 22 refers to the relation between subcarrier phase and sampling point in a block of Hadamard transformation, in which since $$h_5 = \frac{X_1 - X_2 - X_3 + X_4 + X_5 - X_6 - X_7 - X_8}{8},$$

it is known that $h_5$ corresponds to a color signal component.

Quantized sequency components $Y_1$, $Y_x$ ... $Y_8$ are applied to a parallel-serial converter 102 to be converted to serial signals, and are further sent to an error encoder 104. In the error encoder 104, parity signals necessary for correction of error are added to the output signals from the parallel-serial converter 102. The output signals of the error encoder 104 are applied to a channel encoder 106 to be converted into codes suited to be recorded in a magnetic tape, and the codes are recorded in a magnetic tape 112 through a recording head 110 from a recording amplifier 108 at a bit rate of, for example, 28.6 Mbit./ssec.

At the time of reproduction, the reproduction signal taken out of a playback head 114 is passed through a playback amplifier 116 and a channel decoder 118 to be restored to a unconverted digital signal, and the time axis fluctuations in playback are corrected in a time base corrector (TBC) 120. The corrected signal is applied to an error decoder 122, which executes a specified error correction and concealment according to parity signals added in the error encoder 104.

The output of error decoder 122 is applied to a serial-parallel converter 124, and distributed into sequency components, and it is restored to the unquantized 8-bit signal value column by eight inverse quantizers 126, 128 ... 130 which have inverse characteristics of the quantizers used in recording, and is fed to an inverse Hadamard transformer 132. The Hadamard inverse transformation is expressed by the following equation:

$$X = H_8^{-1} \cdot Y \ldots \quad (3)$$

where $H_8^{-1}$ is an inverse matrix of $H_8$.

The signal value column $X=(X_1, X_2, X_3, \ldots, X_7, X_8)$ inverse-Hadamard-transformed in the Hadamard inverse transformer 132 and is applied to an inverse block forming circuit 134, to be restored to the original time series signals at the time of input. In the interpolator composed of a post-filter 136 and an interpolating switch 138, the sampling points thinned out at the time of recording are interpolated by the adjacent sampling points in the surroundings, and are fed to a D/A converter 140 at a rate of $4 \cdot f_{sc}$ to be restored to the original analog signals, which are outputted through an output terminal 142. The interpolation switching circuit 138 is controlled by the ½ divider 146 which divides the clock of $4 \cdot f_{sc}$ frequency applied to terminal 144 to half and the $2 \cdot f_{sc}$ signal produced by a phase switching circuit 148. Incidentally, the $2 \cdot f_{sc}$ signal is designed to shift the phase by 180° in every field by the V CNT signal applied to terminal 150.

Figure 23:
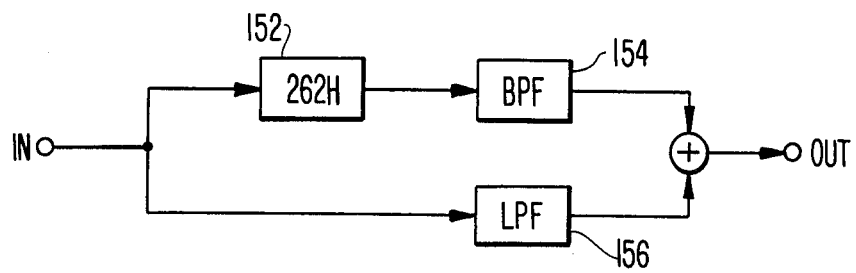
FIG. 23 is a block diagram showing a concrete structure of the post-filter shown in FIG. 9.
Figure 24:
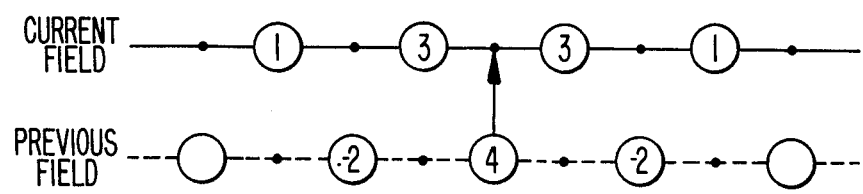
FIG. 24 illustrates the impulse response of the post-filter in FIG. 23.

The structure of the post-filter 136 is explained with reference to its block diagram shown in FIG. 23. In this figure, the structures of 262 H delay memory 152, band pass filter 154 and low pass filter 156 are identical with the corresponding ones of the prefilter 46 shown in FIG. 10. An example of its impulse responses is shown in FIG. 24. That is, supposing that the transmission functions of the band pass filter 154 and low pass filter 156 to be $H_B(Z)$, $H_L(Z)$, respectively, they are expressed as follows.

$$H_B(Z) = -(Z-Z^{-1})^2/4 \ldots \quad (4)$$

$$H_L(Z) = (Z+Z^{-1})^3/8 \ldots \quad (5)$$

where Z is a unit delay operator.

Figure 25:
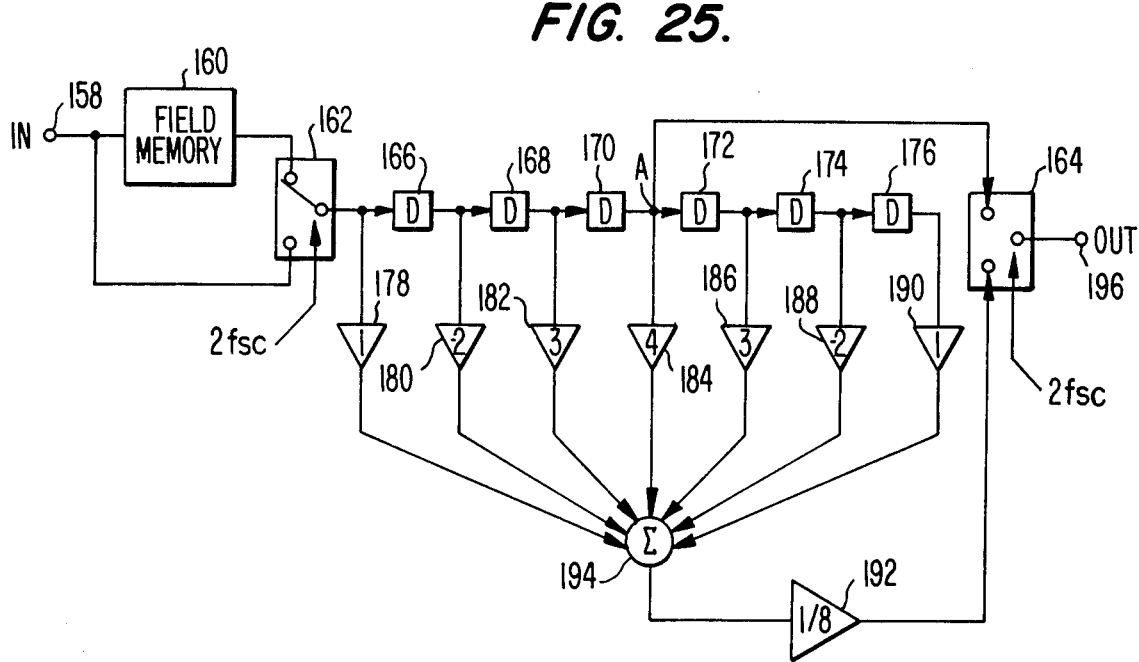
FIG. 25 is a block diagram showing an example of concrete structure of the post-filter in FIG. 23.

An example of concrete structure of the post-filter for realizing equations (4) and (5) is shown in FIG. 25, in which numeral 158 denotes an input terminal, 16 is a field (262H) memories, 162, 164 are switching circuits 166, 168, 170, 172, 174, 176 are delay elements for one $4 \cdot f_{sc}$ clock, 178, 180, 182, 184, 186, 188, 190, 192 are coefficient multipliers, and 194 is an adder. In the switching circuit 162, the signal of the present field applied to the input terminal 158 and the signal of the previous field from the field memory 160 are taken out at a rate of $4 \cdot f_{sc}$ while the phase is being shifted by 180° at every field. The switching circuit 164 is controlled so as to be changed to one fixed contact a side when the signal of present field appears at the output A of the delay lement 170. Thus, interpolated signals are delivered from the output terminal 196 at a rate of $4 \cdot f_{sc}$.

In the embodiment explained above, since the sampling points after sub-sampling are neatly arrayed in a grid form in each filed, the Hadamard transformed block can be composed in a rectangular grid form having the highest efficinecy. In addition, owing to the field type sub-Nyquist sampling, deterioration of resolution by sub-sampligg is little, and pictures of extremely high quality may be achieved at a low recording rate (28.6 Mbits/sec). Furthermore, since Hadamard transformation, one of the block coding methods, is adopted, as a means of high efficiency coding the error propagation is notably improved because its reachable range is only as far as one block (8 samples), as compared with the conventional DPCM or similar methods.

Evidently, this embodiment is extremely advantageous for digital VTR, but the following problems may be predicted.

In the system using field type sub-Nyquist sampling method in this embodiment, the low frequency components of interpolating sample do not matter because they are interpolated from the present field, while high frequency components are interpolated by using the signal of one field before. The signal of one field before is, in other words, a signal of about 1/60 second remote in time, and if the movement of the picture is slight in this duration, the sampling point of high correlation may be used as an interpolating signal, but if the movement of the picture is rapid, this correlation becomes low, which may lead to reduction of resolution or deterioration of the picture quality.

Figure 26:
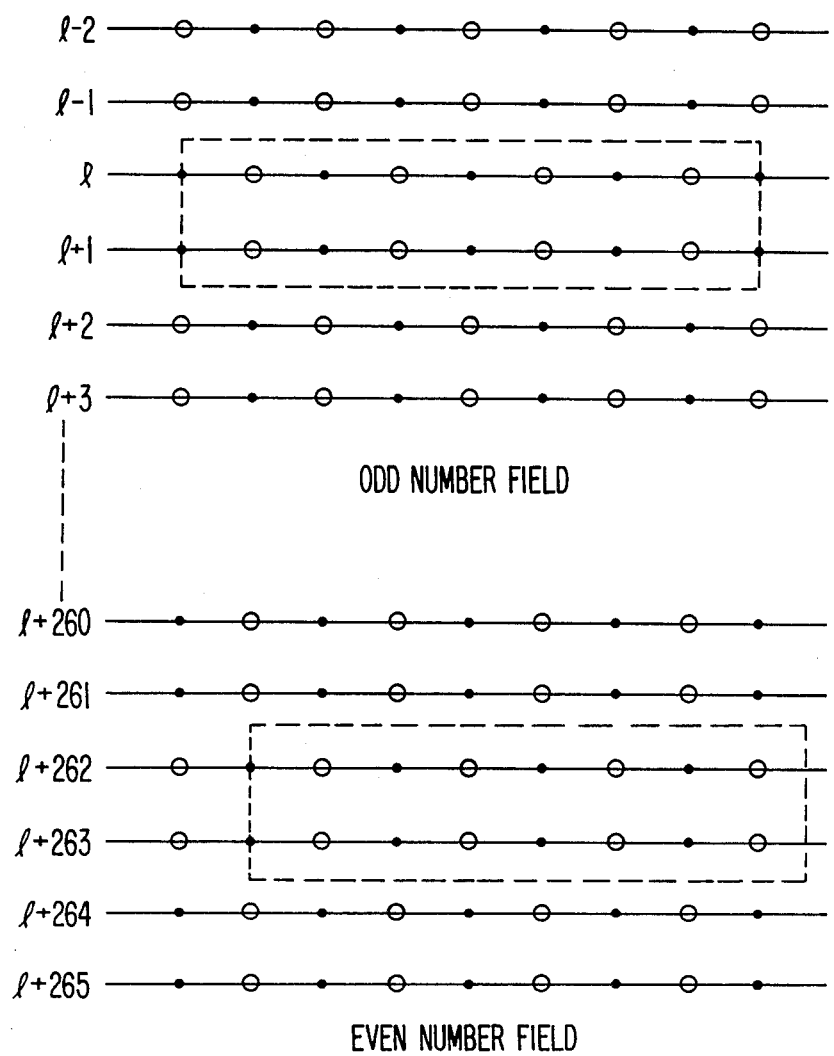
FIG. 26 shows the disposition of sampling points after sub-sampling, in a method of selecting the 2H type sub-Nyquist sampling and the field type sub-Nyquist sampling according to movement of reproduced image.

This problem, however, may be solved by the following method. That is, by detecting time-related-movement of the picture on the TV screen, the method of subNyquist sampling may be freely used by selecting either the interpolation within the field as in 1H type or 2H type, or the interpolation between fields as in field type. That is, the former is used for a slow moving picture, and the latter for a fast moving picture. FIG. 26 shows an example of disposition or pattern of sampling points after sub-sampling for realizing this. Such pattern of the sampling points may be realized by first shifting the phase of the sampling frequency $2 \cdot f_{sc}$ in sub-sampler 60 by 180° at every 2 H and then shifting by 180° at every field.

Figure 27:
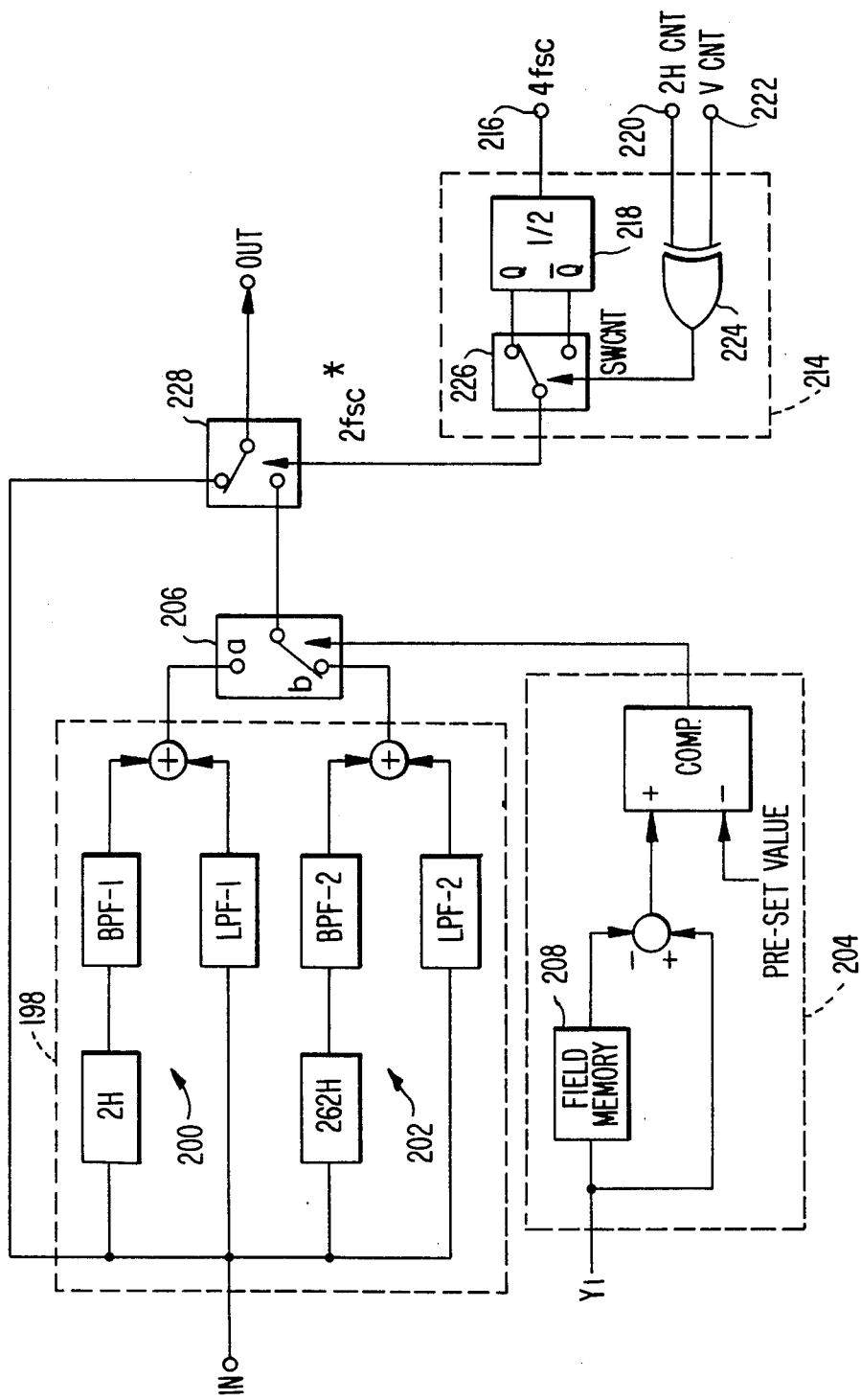
FIG. 27 shows the structure of an interpolator in a method of selecting the 2H type sub-Nyquist sampling and the field type sub-Nyquist sampling according to movement of reproduced image.

The structure of the interpolator in this case is as follows. An example is shown in FIG. 27. The interpolator comprises a post-filter unit consisting of 2H type and field type post-filters, a movement detecting unit for detecting the movement of input picture, and a control unit for controlling the phase of the interpolating sample, and is designed to operate to change over the two post-filters according to the movement of the input picture.

Referring to FIG. 27, a 2 H type filter 200 and a field type filter 202 are available as the post-filter 198, and their output is selected by a switching circuit 206 based on the information from a movement detector 204 which detects the movement of the picture. Since the structure of the post-filter 198 is explained before, further explanation is omitted here. However, it is not always necessary to prepare both 2 H type and field type filters as shown in the drawing (BPF, LPB), but it is possible to share them.

Referring now to the movement detector 204, below is described the method of detecting the movement of the picture by making use of $Y_1$, a component of sequency $h_1$ obtained by Hadamard transformation. As explained above, $Y_1$ is a value corresponding to the mean value of sample values in the block after Hadamard transformation, and it may be regarded as the representative value of the block. Accordingly, in the first place, the difference with the value of one field before is determined with respect to $Y_1$ by means of field memory 208 and subtractor 210, and it is compared with the preset value in a comparator 212. As a result, when the differential signal of $Y_1$ is higher than the preset value, it is judged that there was a movement in that block, and the switching circuit 206 is tilted to one fixed terminal a side, and the output of the 2 H type post-filter 200 is selected, while the value is less than the preset value, to the contrary, it is judged that there was not movement in the block, and the switching circuit 206 is tilted to the other fixed terminal b side so as to control the output of field type post-filter 202.

Figure 28:
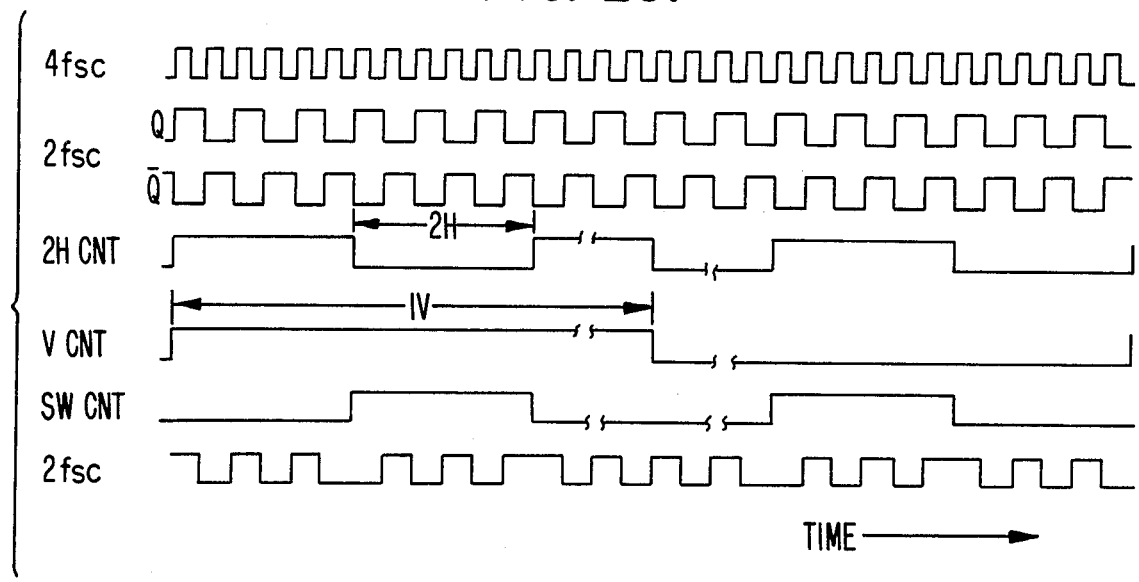
FIG. 28 is a timing chart explaining the operation of the sub-sampling clock generator.

In the interpolation phase controller 214, the clock of 4·$f_{sc}$ applied to a terminal 216 is divided to half by a ½ divider 218, and its output is controlled as shown in FIG. 28 by transmitting the control signals of 2 H CNT and V CNT applied to terminals 220, 222 to a switching circuit 226 through an exclusive OR circuit 224. That is, in FIG. 28, 2H CNT and V CNT are signals periodically repeating low level and high level at every 2 H and 1V (V is the vertical scanning period), respectively, and SW CNT is a signal obtained by exclusive OR between this 2 H CNT and V CNT. By selecting the Q and Q signals of 2·$f_{sc}$ by this SW CNT signal, the changeover signal 2·$f_{sc}$ sent to the switching circuit 228 is shifted in the phase by 180° at every 2 H and is also shifted in the phase by 180° at every V simultaneously.

By this control, the switching circuit 228 delivers signals at a rate of 4·$f_{sc}$ interpolated by the interpolating signal composed by the post-filter selected according to the movement of the picture.

In the explanation above, the component $Y_1$ is used in the detection of movement, but equally other sequency component may be used or plural components may be combined. Or this example is based on the block unit, but it is naturally possible to detect the movement also in the 1 H unit, 2 H unit or field unit. It seems also possible to detect the movement by use of other signals than those after Hadamard transformation. It is further possible to record by using the movement information as the index at the time of recording.

In the description of the preceding embodiments, only Hadamard transformation was considered as the orthogonal transformation, but it is evident that similar effects will be obtained by using other orthogonal transformations, such as K-L transformation and Haar transformation.

Figure 29:
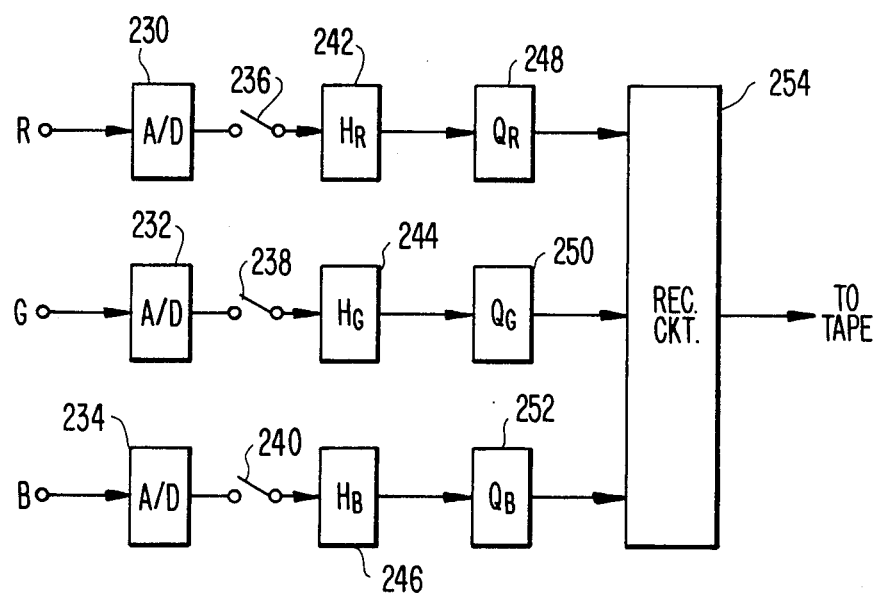
FIG. 29 is a block diagram showing one of the embodiments of the present invention considering component signals (R, G, B) as input signals.

Meanwhile, as the input TV signals, only NTSC composite color signals have been referred to so far, but similar or even better effects may be expected when component color signals or B&W signals are used. FIG. 29 shows part of an embodiment of this invention applied to component color signals of three primaries R, G, B, wherein numerals 230, 232, 234 are A/D converters, 236, 238, 240 are switching circuits as sub-sampler, 242, 244, 246 are Hadamard transformers, 248, 250, 252 are quantizers, and 254 is a circuit responsible for various processing required in recording as explained in the embodiment in FIG. 9. When the input TV signals are component signals as in this example, as compared with NTSC and other composite signals, the correlation between adjacent sampling points is higher by the portion that the subcarrier signals are not superposed, which is advantageous for both sub-Nyquist sampling and Hadamard transformation. Therefore, when the present invention is applied to such input signals, a greater effect is expected.

Furthermore, in this embodiment, Hadamard transformations are separately effectd to R, G, B signals, but it is possible to achieve the same object with one Hadamard transformer by multiplexing the three signals in time sharing before the Hadamard transformation.

It is also evident that similar effects may be obtained when Y, B-Y, R-Y signals, or Y, I, Q signals are fed, instead of R, G, B singals, as the component signals.

Moreover, in this embodiment, a pre-filter is provided in order to eliminate the signal components causing alias component before sub-sampling, but it is not always necessary. Also in this embodiment, the signal is once sampled at a frequency higher than Nyquist frequency (4·$f_{sc}$), and then the sampling points are thinned out to half to realize sub-Nyquist sampling, and it is obvious that the same effect may be obtained when sampled directly at sub-Nyquist frequency.

Concerning the interpolator, incidentally, although the interpolation at a rate twice the sub-sampling frequency has only been considered, but it is the same when the rate after processing is the same as the rate at the time of input into the interpolator.

As to the number of bit, i.e., N, it is not limited to the positive integer and there is a possibility that it becomes decimal number. As to the number of sampling points, i.e., L, it is not limited to $2^k$ (k=integer of not less than 1).

What is claimed is:

1. A digital recording and reproducing apparatus for television signal comprising;
   sampling means for sampling a television signal with upper limit frequency fc at a frequency lower than 2·$f_c$ and for producing a signal quantized into N bits;
   orthogonal transformation means for orthogonally transforming to a data block which is composed of adjacent L sampling points out of the above quantized sampling points;
   quantizing means for quantizing the orthogonally transformed signal into average M bits (M≦N) per sampling point;
   recording means for recording the television signal obtained by said quantizing means onto a recording medium;
   reproduction means for reproducing the recorded television signal from the recording medium;
   inverse quantizing means having the inverse quantizing characteristics of said quantizing means for inversely quantizing the television signal reproduced by the reproduction means;
   orthogonal inverse transformation means having the inverse transformation characteristics of said orthogonal transformation means for inversely transforming orthogonally the inversely quantized signal; and
   interpolating means for synthesizing an interpolating signal from the adjacent sampling points with respect to this inversely orthogonally transformed television signal and for interpolating the reproduction signal by the interpolating signal.

2. The digital recording and reproducing apparatus for television signal according to claim 1, wherein said television signal is a component color television signal.

3. The digital recording and reproducing apparatus for television singal according to claim 1, wherein said television signal is a composite color television signal.

4. The digital recording and reproducing apparatus for television signal according to claim 3, wherein said composite color television signal is a NTSC color television signal, and said sampling frequency is twice the color subcarrier frequency $f_{sc}$.

5. The digital recording and reproducing apparatus for television signal according to claim 1, wherein said sampling frequency is an integer multiple of horizontal scanning frequency fH of the television signal.

6. The digital recording and reproducing apparatus for television signal according to claim 1, wherein said orthogonal transformation is a Hadamard transformation.

7. The digital recording and reproducing apparatus for television signal according to claim 1, wherein said block of orthogonal transformation is composed of adjacent L sampling points arrayed two-dimensionally within a present field.

8. The digital recording and reproducing apparatus for television signals according to claim 1, wherein said block of orthogonal transformation is composed of adjacent L sampling points arrayed three-dimensionally across plural fields or frames of the television signal.

9. The digital recording and reproducing apparatus for television signal according to claim 1, wherein, as said block of orthogonal transformation, a first block which is composed of adjacent L sampling points arrayed two-dimensionally in the field and a second block which is composed of adjacent L sampling points arrayed three-dimensionally across plural fields or frames are selectively used.

10. The digital recording and reproducing apparatus for television signals according to claim 1, wherein said block of orthogonal transformation is composed of adjacent L sampling points arrayed in a rectangular grid form or rectangular body grid form either two-dimensionally or three-dimensionally.

11. The digital recording and reproducing apparatus for television signal according to claim 1, wherein said sampling frequency is $2 \cdot f_{sc}$ ($f_{sc}$ being a color subcarrier frequency).

12. The digital recording and reproducing apparatus for television signal comprising:
quantizing means for sampling a television signal with upper limit frequency fc at a frequency which is lower than $2 \cdot f_c$ and an integer multiple of horizontal scanning frequency fH of television signal and shifting the phase by 180° at least in every field and for producing a signal quantized into N bits;
orthogonal transformation means for orthogonally transforming to a block which is composed of adjacent L sampling points out of the quantized sampling points;
recording means for recording the television signal obtained by quantizing onto a recording medium;
reproduction means for reproducing the recorded television signal from the recording medium;
inverse quantizing means having the inverse characteristics of said quantizing means for inversely quantizing the television signal reproduced by the reproduction means;
orthogonal inverse transformation means having the inverse transformation characteristics of said orthogonal transformation means for inversely transforming orthogonally the inversely quantized signal; and
interpolating means for synthesizing and interpolating signal from adjacent smapling points of at least one field before with respect to the inversely orthogonally transformed television signal and for interpolating the reproduction signal by the interpolating signal.

13. The digital recording and reproducing apparatus for television signal according to claim 12, wherein said block of orthogonal transformation is composed of adjacent L sampling points arrayed in a rectangular grid form in a field.

14. The digital recording and reproducing apparatus for television signal according to claim 12, wherein said interpolating means is composed so as to interpolate the higher frequency components of the recorded television signal from the adjacent sampling points of one field before and the lower frequency components from the adjacent sampling points in the present field.

15. A digital recording and reproducing apparatus for television signal comprising;
quantizing means for sampling a television signal with upper limit frequency fc at a frequency which is lower than $2 \cdot f_c$ and an interger multiple of horizontal scanning frequency fH of television signal and shifting the phase by 180° at least in every field and for producing a signal quantized into N bits;
orthogonal transformation means for orthogonally transforming to a block which is composed of adjacent L sampling points out of the quantized sampling points;
recording means for recording the television signal obtained by quantizing onto a recording medium;
reproduction means for reproducing the recorded television signal from the recording medium;
inverse quantizing means for inversely quantizing the television signal reproduced by the reproduction means;
orthogonal inverse transformation means for transforming inversely as of said orthogonal transformation;
a movement detecting means for detecting the variation of the reproduction signal in relation to the time;
first interpolating signal synthesizing means for synthesizing an interpolating signal from adjacent sampling points in a present field;
second interpolating signal synthesizing means for synthesizing an interpolating signal from adjacent sampling points of at least one field before;
interpolating signal selecting means for selecting either one of the outputs of the first and second interpolating signal synthesizing means according to the information from the movement detecting means; and
interpolating means for interpolating the reproduction signal by the interpolating signal selected by the interpolating signal selecting means.

16. A digital recording and reproducing method for television signal comprising:
a first step that a television signal with upper limit frequency fc is sampled at frequency which is lower than $2 \cdot f_c$ to be quantized into N bits;
a second step that the sampled signal is orthogonally transformed to a block which is composed of adjacent L sampling points out of the quantized sampling points to be quantized into an average of M bits per sampling point ($M \leq N$);
a third step that the digital television signal thus obtained by quantizing is recorded onto a recording medium;
a fourth step that the recorded digital television signal is reproduced from the same recording medium;
a fifth step that the reproduced signal is quantized inversely as of the quantizing after orthogonal transformation to be restored to the original N-bit signal and transformed inversely as of the above orthogonal transformation; and
a sixth step that an interpolating signal is synthesized from the adjacent sampling points for this inversely orthogonally transformed television singal, then the reproduction signal is interpolated by the interpolating signal.

17. A digital recording apparatus for television signals comprising;

sub-Nyquist sampling means for sampling a television signal with upper limit frequency fc at a frequency lower than $2 \cdot f_c$;

orthogonal transformation means for assembling the sampled sampling points into a block and for orthogonally transforming into the block;

quantizing means for quantizing the orthogonally transformed signal; and recording means for recording the quantized television signal onto a recording medium.

18. A digital recording and reproducing apparatus for television signal intended to sample a television signal with upper limit frequency $f_c$ at a frequency lower than $2 \cdot f_c$, to assemble the sampled sampling points into a block, to orthogonally transform to the block, to quantize the orthogonally transformed signal, and to record the signal onto a recording medium, comprising;

reproduction means for reproducing the recorded television signal;

inverse quantizing means having the inverse quantizing characteristics of the quantizing in the recording mode for inversely quantizing the television signal reproduced by the reproduction means;

orthogonal inverse transformation means having the inverse transformation characteristic of the orthogonal transformation in the recording mode for inversely transforming orthogonally the inversely quantized signal; and interpolating means for synthesizing an interpolating signal from adjacent sampling points with respect to the inversely orthogonally transformed television signal and for interpolating the reproduction signal by the interpolating signal.

* * * * *